United States Patent [19]

Brent, Jr. et al.

[11] 4,254,253

[45] Mar. 3, 1981

[54] PREPARATION OF HIGH MOLECULAR WEIGHT POLYESTER

[75] Inventors: James W. Brent, Jr., Munroe Falls; Lawrence E. Shelley, Akron, both of Ohio

[73] Assignee: The Goodyear Tire & Rubber Company, Akron, Ohio

[21] Appl. No.: 123,222

[22] Filed: Feb. 21, 1980

[51] Int. Cl.$^3$ .............................................. C08G 63/26
[52] U.S. Cl. ................................... 528/272; 528/309; 528/480; 560/96
[58] Field of Search ..................... 528/272, 309, 480; 560/96

[56] References Cited

U.S. PATENT DOCUMENTS

| | | | |
|---|---|---|---|
| 4,064,112 | 12/1977 | Rothe et al. | 528/272 |
| 4,161,578 | 7/1979 | Herron | 528/272 |
| 4,165,420 | 8/1979 | Rinehart | 528/272 X |

*Primary Examiner*—Lucille M. Phynes
*Attorney, Agent, or Firm*—J. P. Ward

[57] ABSTRACT

This invention comprises an improvement in the preparation of high molecular weight polyester, said improvement comprising simultaneously and continuously crystallizing, drying and heating low molecular weight particulated, melt polymerized linear condensation polyester prepolymer resin by subjecting said prepolymer resin to a high frequency energy field in the range from about 20.0 to about 300 megahertz for a period of time ranging from about 20 to 90 seconds.

6 Claims, No Drawings

PREPARATION OF HIGH MOLECULAR WEIGHT POLYESTER

TECHNICAL FIELD

The invention, as described in more specific detail hereinbelow, relates to an improvement in the preparation of high molecular weight linear condensation polyesters by means of the solid phase polymerization of corresponding particulated, low molecular weight melt polymerized polyester prepolymer resins. More particularly, the invention relates to a method for the rapid and simultaneous crystallization, drying and heating of said particulated prepolymer resins to solid phase polymerization temperatures by means of high frequency energy prior to subjecting said prepolymer resins to solid phase polymerization conditions.

BACKGROUND OF THE INVENTION

Generally, two major and distinct process steps are employed in the production of high molecular weight polyesters involving solid phase polymerization techniques. The first step involves the preparation of a low molecular weight polyester prepolymer resin using either a batch or a continuous melt phase polymerization process. The resulting molten prepolymer is then solidified and converted into a particulated form such as, for example, pellets, diced cubes, granules, powders, etc., and is known in the art as solid phase feed polymer. This prepolymer or solid phase feed polymer (these terms being used interchangeably throughout this specification) typically will have an intrinsic viscosity in the range from about 0.35 to about 0.60 and a moisture content ranging from about 0.40 to about 0.25 percent by weight and will be amorphous, as evidenced by its having a density of 1.34 grams per cubic centimeter or less.

The second step involves the actual solid phase polymerization of the above-described particulated prepolymer to the desired high molecular weight product. For polyethylene terephthalate, the solid phase polymerization step is normally conducted at temperatures ranging from about 185° C. to about 250° C. and preferably from about 220° C. to about 240° C. in an inert gas atmosphere or in vacuum employing either batch rotary blender-dryers, fluid bed dryers, tray dryers or continuous gravity flow reaction towers.

In addition, it is a generally acknowledged and accepted fact that because of the wet, amorphous nature of this prepolymer it is necessary to subject it to an intermediate step wherein the prepolymer is heated, dried and crystallized to avoid degradation and agglomeration of the prepolymer when it is exposed to solid phase polymerization conditions. It is also known that when subjecting said wet, amorphous prepolymer to this intermediate step the particulated prepolymer will tend to agglomerate into an unmanageable mass, just as in the solid phase polymerization step, unless means are taken to prevent this fusion. One means of preventing fusion of the particulated prepolymer during the heating, drying and crystallization thereof is to subject the prepolymer to vigorous forced motion. Examples of processes for the pretreatment of polyester prepolymer in which vigorous forced motion prepolymer is employed include U.S. Pat. Nos. 4,064,112 and 4,161,578. However, a major drawback to processes employing vigorous forced motion of the particulated prepolymer during the heating, drying and crystallization thereof is the generation of polymeric fines which can account for from about 0.06 to about 0.11 percent by weight of the total weight of prepolymer being treated. The presence of these fines in the prepolymer is undesirable not only because they give rise to handling problems but also because of the adverse effect they have on the quality and uniformity of the final polymeric product and its performance when subjected to operations such as melt spinning and injection molding.

Another approach to the heating, drying and crystallization of particulated wet amorphous polyester prepolymer prior to the solid phase polymerization thereof is the process described in U.S. Pat. No. 3,634,359. In this patent is disclosed an improvement in a process for the preparation of high molecular weight polyesters, particularly high molecular weight polyethylene terephthalate, by after-condensing the corresponding low molecular weight polyester in the solid phase. The specific improvement in the process is stated to be the drying, crystallizing and heating of the low molecular weight prepolymer to solid phase polymerization temperatures by means of high frequency energy in the presence of a streaming dry gas.

In carrying out the process described in the above-referenced patent it is stated that the use of a streaming dry gas and the manner in which the heating with high frequency is performed are extremely important limitations on the successful operation of the process. According to this patent, the use of a streaming dry gas is essential for the instant withdrawal of water set free from the polyester during the heating process if hydrolytic decomposition of the polyester is to be maintained within tolerable limits and that the heating must be conducted in such a manner that the range of temperature in which crystallization takes place with optimum speed is not exceeded before the polyester has adapted the crystallite form in order to avoid melting the granulated polyester into a solid lump. The specific manner in which the heating is to be conducted is disclosed as consisting of either slowly heating the polyester to condensation temperature, i.e. between 5 and 15 minutes with constant movement of the granulated polyester or rapidly heating the polyester to 100° C. to 180° C., maintaining the polyester in a field-free space at the temperature reached until it is sufficiently crystallized and then and only then subjecting said crystallized polyester to further high frequency heating to raise the temperature thereof to condensation temperatures. The deleterious effects which occur as a result of not using a streaming dry gas and heating too rapidly are illustrated in Example 3 of the patent. In that example granulated polyethylene terephthalate was heated to 240° C. within 5 minutes and in the absence of a streaming dry gas. The effects of such a rapid heating and lack of a streaming dry gas were that the material melted together into a solid clump and that the specific viscosity (which is a measure of its molecular weight) of the material was reduced from an original value of 0.88 to a value of 0.75, a 17 percent decrease.

Disclosure of the Invention

The applicant has now discovered that contrary to the teachings of the above-referenced United States Patent, particulated low molecular weight polyester prepolymer resin can be rapidly and continuously heated in a high frequency energy field to solid phase polymerization temperatures of 185° C. to 250° C. either in the absence or presence of a streaming dry gas, such as nitrogen or air, to simultaneously achieve the desired crystallization, drying and heating up of the prepolymer resin without a significant reduction in its molecular weight or the formation of a solid, non-friable mass.

Accordingly, applicants' invention comprises an improvement in the preparation of particulated high molecular weight linear condensation polyesters having intrinsic viscosities of at least 0.6 deciliters per gram by solid phase polymerization of corresponding particulated low molecular weight melt polymerized linear condensation polyester prepolymer resins having intrinsic viscosities of at least 0.35 deciliters per gram which improvement comprises simultaneously and continuously (a) crystallizing the particulated prepolymer resin having an initial density 1.34 grams per cubic centimeter or less to a density ranging from about 1.37 to about 1.39 grams per cubic centimeter, (b) drying the particulated prepolymer resin having an initial water content of from about 0.40 percent to 0.25 percent to a water content ranging from about 0.10 percent to about 0.005 percent and (c) heating said particulated prepolymer resin to a solid phase polymerization temperature ranging from about 185° C. to about 250° C. and preferably from about 210° C. to about 240° C. by subjecting said particulated prepolymer to a continuous and uninterrupted high frequency field ranging from about 20 megahertz to about 300 megahertz for a period of time ranging from about 20 seconds to about 90 seconds. The invention is more fully demonstrated by reference to the examples set forth immediately below. The intrinsic viscosities recited for all polyester samples were determined employing a solution comprised of 0.4 grams of polymer in 100 ml. of a 60/40 phenol/tetrachloroethane mixed solvent measured at 30° C. All percentages given for the moisture content of both untreated and treated polyester prepolymer resins are by weight unless specified otherwise. All experiments were carried out in the absence of a streaming dry gas.

EXAMPLE 1

Particulated, melt polymerized polyethylene terephthalate prepolymer resin having an I.V. of 0.52 dl/gm, a density of 1.34 grams per cubic centimeter (gm/cc) and a water content of 0.34 percent was continuously deposited on a moving 5 cm. wide conveyor belt of a high frequency heating apparatus, which belt transported the resin between two opposed vertically positioned electrodes. The resin was continuously and uninterruptedly exposed to a high frequency energy field of 27 megahertz (MHz) and heated to 210° C. as it passed through the high frequency apparatus at a rate of 15 kilograms (Kg) per hour. The time of exposure to the high energy field of any given resin particle was about 64 seconds. The crystallized, dried and heated resin exited the high frequency heating apparatus in the form of a friable cake which when subjected to a very slight hand pressure, crumbled into individual particles of the same size and configuration as the starting prepolymer. The treated resin had an I.V. of 0.51 dl/gm, a density of 1.39 gm/cc (i.e. approximately 30 percent crystallinity) and a water content of 0.06 percent.

EXAMPLE 2

In a manner similar to that employed in Example 1 above, particulated, melt polymerized polyethylene terephthalate prepolymer resin having an I.V. of 0.59 dl/gm and a density of about 1.34 gm/cc was continuously added to a moving 38 cm. wide conveyor belt of a high frequency heating apparatus through which the resin was transported between two opposed horizontally positioned electrodes. The resin was continuously and uninterruptedly exposed to a high energy field of 100 MHz as it passed through the high frequency heating apparatus. In passing through the high frequency heating apparatus, the pelletized prepolymer was heated from ambient temperature (~24° C.) to about 210° C. with the exposure residence time of any given resin particle to the high energy field being about 23 seconds. The crystallized, dried and heated prepolymer resin particles were only very slightly stuck together as they exited the apparatus and were readily broken apart with the application of very slight hand pressure. The treated resin had an I.V. of 0.58 dl/gm and a density of about 1.39 gm/cc (i.e. about 31 percent crystallinity).

EXAMPLE 3

To further demonstrate the friable nature of particulated melt polymerized polyethylene terephthalate prepolymer resin which is simultaneously crystallized, dried and heated to solid phase condensation temperatures in accordance with the process of the present invention, a small glass beaker was filled completely with the particulated prepolymer having an I.V. of 0.45 dl/gm. The beaker filled with the prepolymer was then placed in a 27 MHz high energy field and rapidly and continuously heated until the prepolymer had reached a temperature of about 205° C. as measured by an optical pyrometer. Total exposure time of the prepolymer to the high energy field was 60 seconds. The beaker was then removed from the field and inverted to remove the prepolymer resin, the particles of which were adhered together, forming a friable mass conforming to the shape of the beaker. Using very slight hand pressure, the mass was readily and easily broken apart back into individual particles.

Comparative Example

To demonstrate the necessity of rapid heating (i.e. between 20 seconds and 90 seconds) when high frequency energy is employed to simultaneously crystallize, dry and heat prepolymer in accordance with the method of the present invention and the need to use a high energy field of at least 20 MHz particulated polyethylene terephthalate prepolymer resin having an I.V. of 0.50 dl/gm was placed in a glass dish measuring approximately 33 cm×23 cm×6 cm deep. The dish containing the granules was then placed in a 16 MHz high energy field and heated to 210° C. It required 2.5 minutes to reach the desired temperature. When the heated material was removed from the high energy field and then from the glass dish it had formed a solid mass conforming to the shape of the dish which could not be broken into individual particles without the use of excessive pressure.

EXAMPLE 4

Approximately 23.0 kilograms of treated polyethylene terephthalate prepolymer resin from Example 1 was subjected to batch, solid phase polymerization conditions in a rotating blender/dryer polymerization apparatus. The polymerization was carried out at about 237° C. in vacuo. After 9.4 hours of residence time the resin I.V. had increased from 0.51 dl/gm to 0.72 dl/gm and further increased to 0.85 dl/gm after a total of 15.6 hours of residence time.

In the above illustrative examples it can be seen that, contrary to the teachings of U.S. Pat. No. 3,634,359, particulated, low molecular weight, melt polymerized linear condensation polyester prepolymer resin can be rapidly heated to solid phase polymerization temperatures without melting the particulated prepolymer resin into a melted, unuseable mass and without any significant detrimental effect on the properties of the prepolymer such as a decrease in its molecular weight as represented by the intrinsic viscosity values. This latter result is particularly surprising in light of the fact that in the above examples no streaming dry gas was used to remove moisture released from the prepolymer resin being subjected to the high frequency energy field.

High frequency energy levels ranging from 20 megahertz (MHz) to 300 MHz can be used in carrying out the invention of the present application. A more preferred range is from about 25 MHz to about 150 MHz with a range of from about 27 MHz to about 100 MHz being the most preferred.

The specific high frequency energy level employed to simultaneously and continuously crystallize, dry and heat polyester prepolymer resin to solid phase polymerization temperatures in accordance with the present invention will depend on the length of time the prepolymer resin will be exposed to the high frequency energy field and on the initial temperature of the starting prepolymer resin. In general a higher energy level will be required for short exposure times, e.g. 20 seconds, and a lower energy level for long exposure times, e.g. 90 seconds. Furthermore, a prepolymer resin having a lower initial starting temperature, e.g. ambient temperature, will require a higher energy level than a prepolymer having a higher initial starting temperature, that is a temperature higher than ambient temperature, for any given exposure time between 20 and 90 seconds. In actual practice, the initial temperature of the starting prepolymer can range from ambient temperature to about 80° C. While the precise energy level will vary as is evident from the above, these teachings provide a general guideline to one of ordinary skill in this art for readily determining the proper energy level to be used to carry out the present invention.

Once the particulated polyester prepolymer resin has been crystallized, dried and heated to solid phase polymerization temperatures, it is then in a condition where it can be solid phase polymerized employing such well-known processes as fluidized bed, fixed or so-called static bed, plug flow or gravity flow bed type processes such as the one exemplified in U.S. Pat. No. 3,756,990 or batch type processes such as those employing rotary blender-dryers. Preferably, the treated prepolymer resin will be discharged from the high frequency heating apparatus directly into the polymerization vessels employed in such processes. However, the treated prepolymer resin may also be discharged into holding tanks or bins for subsequent polymerization depending on the nature and design of the particular process employed.

Generally, these processes are operated in such a manner that the treated particulated polyester prepolymer is heated at temperatures ranging from about 185° C. to 250° C. and more preferably between 210° C. and 240° C. and maintained within these temperature ranges in an inert gas stream or under vacuum until the desired molecular weight is obtained.

The invention was illustrated in the examples above using polyethylene terephthalate since this particular polyester is preferred in view of its importance and widespread use as a base material in the manufacture of such products as films and fibers and more recently carbonated beverage bottles. However, it will be readily apparent to one of ordinary skill in the polyester field that the invention is applicable to the simultaneous and continuous crystallization, drying and heating of other particulated, low molecular weight melt polymerized polyester prepolymer resins intended to be subjected to solid phase polymerization conditions. Representative examples of such other prepolymer resins include those prepared by the melt polymerization of the reaction product of dicarboxylic acids or their lower ($C_1$-$C_4$) alkyl esters with the polymethylene glycols containing from 2 to 10 carbon atoms.

While certain representative embodiments and details have been shown for the purpose of illustrating the invention, it will be apparent to those skilled in this art that various changes and modifications may be made therein without departing from the spirit or scope of the invention.

We claim:

1. In the preparation of particulated, high molecular weight polyesters having an intrinsic viscosity of at least 0.6 deciliters per gram by solid phase polymerization of a corresponding particulated, low molecular weight melt polymerized linear condensation polyester prepolymer resin having an intrinsic viscosity of at least 0.35 deciliters per gram, the improvement which comprises simultaneously and continuously
   (a) crystallizing said particulated prepolymer resin having an initial density of 1.34 grams per cubic centimeter or less to a density ranging from about 1.37 to about 1.39 grams per cubic centimeter;
   (b) drying said particulated prepolymer having an initial water content of from about 0.40 percent to about 0.25 percent to a water content ranging from about 0.10 percent to about 0.005 percent; and
   (c) heating said particulated prepolymer to a solid phase polymerization temperature ranging from about 185° C. to about 250° C. by subjecting said particulated prepolymer resin to a continuous and uninterrupted high frequency energy field in the range of from about 20 megahertz to about 300 megahertz for a period of time ranging from about 20 seconds to about 90 seconds.

2. The improved process of claim 1 wherein is employed a continuous and uninterrupted high frequency energy field in the range of from about 25 megahertz to about 150 megahertz.

3. The improved process of claim 2 wherein the high frequency energy field ranges from about 27 megahertz to about 100 megahertz.

4. The improved process of claim 1 wherein the particulated, melt polymerized, linear condensation polyester prepolymer is heated in the high frequency energy field to a solid phase polymerization temperature ranging from about 210° C. to about 240° C.

5. The improved process of claim 1 wherein the particulated, melt polymerized, linear condensation polyester prepolymer is polyethylene terephthalate.

6. The improved process of claim 1 wherein the initial temperature of the polyethylene terephthalate prepolymer ranges from about ambient temperature to about 80° C.

* * * * *